United States Patent
Gagne et al.

(10) Patent No.: US 11,536,813 B1
(45) Date of Patent: Dec. 27, 2022

(54) TECHNIQUES FOR DESCAN COMPENSATION IN A FMCW LIDAR SYSTEM

(71) Applicant: AEVA, INC., Mountain View, CA (US)

(72) Inventors: Keith Gagne, Santa Clara, CA (US); Adrian Cort, San Francisco, CA (US); Oguzhan Avci, San Francisco, CA (US); Kevin Pollock, San Jose, CA (US); Pierre Hicks, San Francisco, CA (US); Mina Rezk, Haymarket, VA (US); Behsan Behzadi, Sunnyvale, CA (US); Gautam Prabhakar, Los Altos, CA (US)

(73) Assignee: Aeva, Inc.

( * ) Notice: Subject to any disclaimer, the term of this patent is extended or adjusted under 35 U.S.C. 154(b) by 0 days.

(21) Appl. No.: 17/842,557

(22) Filed: Jun. 16, 2022

(51) Int. Cl.
  *G01S 7/4912* (2020.01)
  *G01S 7/481* (2006.01)
  *G01S 7/499* (2006.01)

(52) U.S. Cl.
  CPC .......... *G01S 7/4917* (2013.01); *G01S 7/4817* (2013.01); *G01S 7/499* (2013.01)

(58) Field of Classification Search
  CPC .............................. G01S 7/4917; G01S 7/4817
  See application file for complete search history.

(56) References Cited

U.S. PATENT DOCUMENTS

| 10,908,267 B1 * | 2/2021 | Gagne | G01S 17/931 |
| 11,366,203 B1 * | 6/2022 | Wood | G01S 7/4914 |
| 2006/0227317 A1 * | 10/2006 | Henderson | G01S 17/89 356/28 |
| 2018/0372847 A1 * | 12/2018 | Upton | G01S 17/42 |
| 2020/0096615 A1 * | 3/2020 | Upton | G02B 26/10 |
| 2020/0150243 A1 * | 5/2020 | Di Chele | G01S 7/4817 |
| 2020/0300980 A1 * | 9/2020 | Behzadi | G01S 7/4817 |

* cited by examiner

*Primary Examiner* — Eric L Bolda
(74) *Attorney, Agent, or Firm* — Womble Bond Dickinson (US) LLP

(57) ABSTRACT

A LiDAR system includes an optical subsystem with an optical axis. The optical subsystem includes an optical source to emit an optical beam, a first optical lens to transmit the optical beam, an optical window to reflect a first portion of the optical beam to generate a LO signal, an optical scanner to transmit a second portion of the optical beam to a target to scan the target to generate a target return signal, a second optical lens to transmit the LO signal and the target return signal to a PD, and the PD to mix the target return signal with the LO signal to extract range and velocity information. The LO signal is disposed to be decentered from the optical axis on the second optical lens to increase a percentage of an overlap of the LO signal and the target return signal on a detection plane of the PD.

20 Claims, 13 Drawing Sheets

TECHNIQUES FOR DESCAN COMPENSATION IN A FMCW LIDAR SYSTEM

TECHNICAL FIELD

The present disclosure relates generally to light detection and ranging (LiDAR) systems, and more particularly to descan compensation in a FMCW LiDAR system.

BACKGROUND

A FMCW LiDAR system mixes a local oscillator (LO) signal with a return target signal which is the reflected light from a target to extract range and velocity information. A reflective scanner is used to scan the illumination across a target plane. To increase the frame rate, the scan speed of the scanner is increased. The increased scan speed causes a spatial misalignment of the target signal with respect to the LO signal at the detector. This misalignment degrades the spatial mixing efficiency of the target return signal and the LO signal, consequently reducing the overall signal to noise ratio of the LiDAR system.

SUMMARY

The present disclosure describes various examples of LiDAR systems with descan compensation.

In some examples, disclosed herein are an optical subsystem of a LiDAR system and methods for mitigating signal losses due to the lag-angle descan through a vertical (or horizontal) displacement of an imaging lens or a tilted LO surface. Through the vertical lens displacement and/or the tilted LO surface, both the LO signal and the target return signal may be shifted at the detection plane. The magnitude of either of these corrections may be directly determined by the severity of the lag-angle descan. The displacement magnitude and direction may be tuned to accommodate different descan conditions. Due to the nature of the system, the LO signal has a significantly larger sensitivity to these corrections relative to the target return signal. By this way, the overlap between the target return signal and the LO signal may be increased, thereby increasing the coherent mixing efficiency of the LiDAR system, e.g., for a fast scanning LiDAR system. The signal to noise ratio (SNR) of the optical receivers may be increased, and the performance of the LiDAR system may be improved.

In some examples, a LiDAR system is disclosed herein. The LiDAR system includes an optical subsystem with an optical axis. The optical subsystem includes an optical source to emit an optical beam, a first optical lens to transmit the optical beam, an optical window aligned with the first optical lens to reflect a first portion of the optical beam to generate a local oscillator (LO) signal. Further downstream from the optical window, an optical scanner is used to transmit the remaining portion of the optical beam to a target, in order to scan the target and generate a target return signal. The optical subsystem includes a second optical lens and a photodetector (PD). The second optical lens is configured to transmit the LO signal and the target return signal to a photodetector (PD). The photodetector (PD) is configured to mix the target return signal with the LO signal to extract range and velocity information of the target, wherein the LO signal is disposed to be decentered from the optical axis on the second optical lens to increase a percentage of an overlap of the LO signal and the target return signal on a detection plane of the PD.

In some examples, a method of light detection and ranging is disclosed herein. The method includes emitting an optical beam by an optical source. The method includes transmitting, by a first optical lens, the optical beam to an optical window. The method includes reflecting a first portion of the optical beam, by the optical window, to generate a local oscillator (LO) signal. The method includes transmitting a second portion of the optical beam to a target to scan the target to generate a target return signal. The method further includes transmitting, by a second optical lens, the LO signal and the target return signal to a photodetector (PD). The method further includes disposing the LO signal to be decentered from an optical axis of an optical system on the second optical lens to increase a percentage of an overlap of the LO signal and the target return signal on a detection plane of the PD. The method further includes mixing, by the PD, the target return signal with the LO signal to extract range and velocity information of the target.

It should be appreciated that, although one or more embodiments in the present disclosure depict the use of point clouds, embodiments of the present invention are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
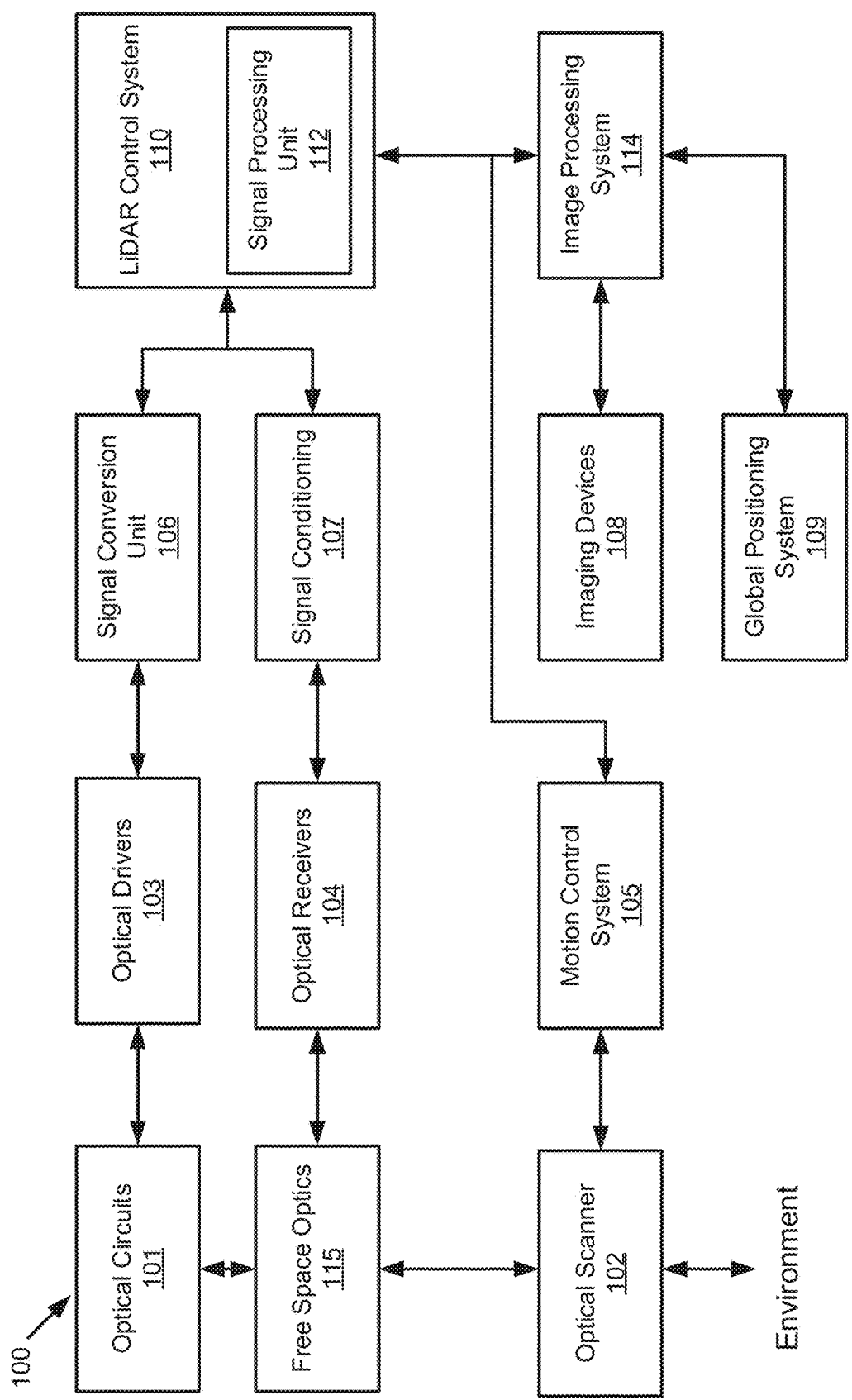
FIG. 1A is a block diagram illustrating an example LiDAR system according to embodiments of the present disclosure.

FIG. 1A illustrates a LiDAR system 100 according to example implementations of the present disclosure. The LiDAR system 100 includes one or more of each of a number of components, but may include fewer or additional components than shown in FIG. 1A. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position or angle to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
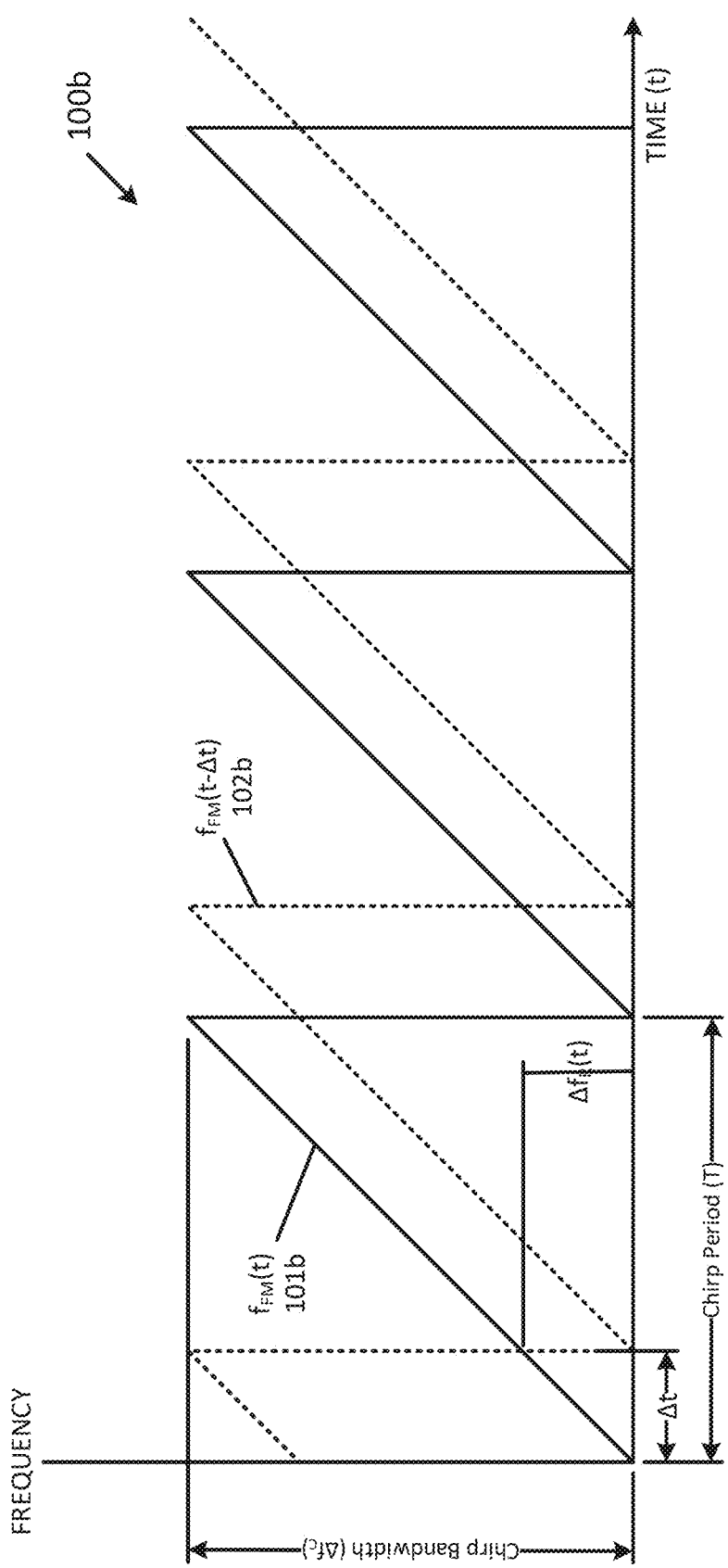
FIG. 1B is a time-frequency diagram illustrating an example of FMCW LIDAR waveforms according to embodiments of the present disclosure.

FIG. 1B is a time-frequency diagram $100b$ of an FMCW scanning signal $101b$ that can be used by a LiDAR system, such as system 100, to scan a target environment according to some embodiments. In one example, the scanning waveform $101b$, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 1B also depicts target return signal $102b$ according to some embodiments. Target return signal $102b$, labeled as $f_{FM}(t-\Delta t)$, is a time-delayed version of the scanning signal $101b$, where $\Delta t$ is the round trip time to and from a target illuminated by scanning signal $101b$. The round trip time is given as $\Delta t=2R/v$, where R is the target range and v is the velocity of the optical beam, which is the speed of light c. The target range, R, can therefore be calculated as $R=c(\Delta t/2)$. When the return signal $102b$ is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 102b will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 1B for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max} = (c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 2B:
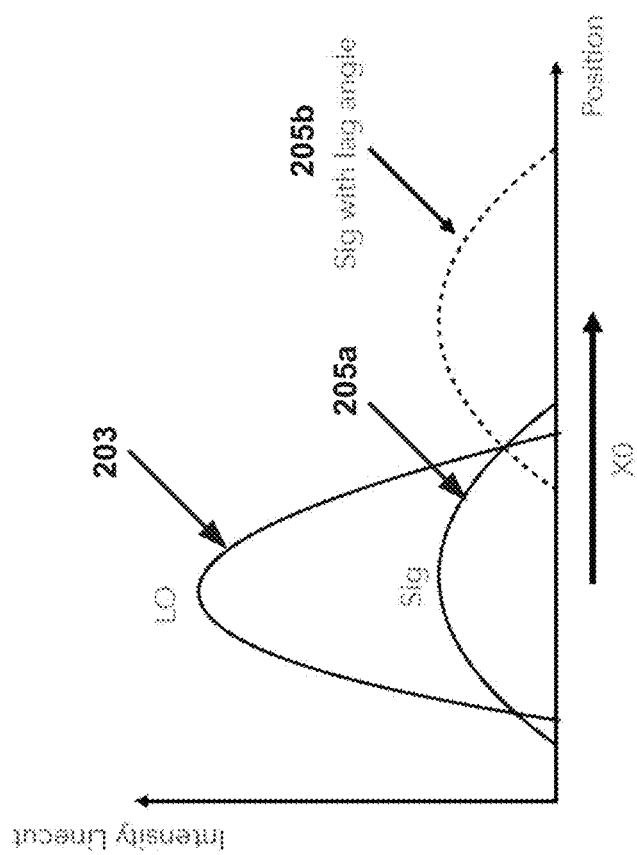
FIG. 2B is a diagram illustrating an example of intensity profile at a detection plane of a LiDAR system without descan compensation according to embodiments of the present disclosure.
Figure 2A:
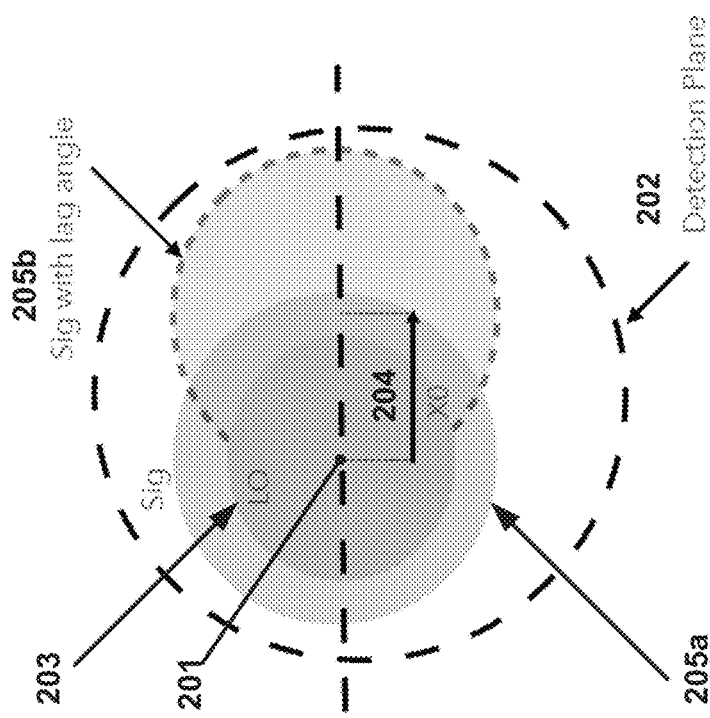
FIG. 2A is a diagram illustrating an example of a detection plane of a LiDAR system without descan compensation according to embodiments of the present disclosure.

FIG. 2A is a diagram illustrating an example of a detection plane 201 of a LiDAR system without descan compensation. FIG. 2B is a diagram illustrating an example of intensity profile at the detection plane 201 in FIG. 2A. Currently, fast-scanning mirrors may be used to illuminate a scene in LIDAR systems. For example, one scanning mirror may scan fast along the X direction (horizon), while another scanning mirror scans may slow along the Y direction (elevation). The collected light has an altered frequency signature that is used to extract range information. As discussed above, the signal processing unit 112 (as illustrated in FIG. 1A) may generate a 3D point cloud with information about range and velocity of the target.

To increase the frame rate, while maintaining the same number of points per frame, usually the scan speed of the scanning mirror (e.g., in one direction) is increased. During the time the optical beam (frequency sweep) propagates to the distant target and returns to the scanning system, the scanning mirror moves due to a high scan speed (e.g., high rotational velocity) of the scanning mirror. The increased scan speed causes a spatial misalignment of the target signal with respect to the LO signal at the detector of the LiDAR system. This misalignment may severely degrade the spatial mixing efficiency of the target return signal and the LO signal, consequently reducing the overall signal to noise ratio of the LIDAR system. For example, when the scan speed of the scanning mirror is faster than 100 Hz at long ranges (>3000 degrees per second), the spatial mixing efficiency is severely degraded.

Referring to FIG. 2A and FIG. 2B, a LiDAR system (e.g., LiDAR system 100 in FIG. 1A) may include an optical subsystem with an optical axis 201. For example, a LO signal 203 and a target return signal 205a may be designed to overlap at a detection plane 202 of an optical receiver (e.g., one of optical receivers 104 in FIG. 1A). The LO signal 203 and the target return signal 205a may be designed to align around the optical axis 201. However, due to a high scan speed of a scanning mirror, the actual target return signal 205b may have a lag angle at the detection plane 202. As depicted in FIG. 2B, the intensity profile of the actual target return signal 205b may be shifted with the lag angle. With a high scan speed of the scanning mirror, a spatial misalignment 204 of the actual target return signal 205b with respect to the LO signal 203 may occur at the detector plane 202 of the LiDAR system. The spatial misalignment reduces the overall signal to noise ratio of the LIDAR system. As an example, a descan may refer to the target return signal being shifted with an angle at the detector plane, e.g., due to the high scan speed. The FMCW LiDAR system mixes the target return signal and the LO to extract the range and velocity information, hence the performance of the FMCW LiDAR system is based on the ability to combine the two signals. Moreover, for fast scanning LiDAR systems, the descan may rapidly degrade the signal to noise ratio (SNR) of the optical receiver due to the spatial displacement of the target return signal and the LO signal at the detection plane. There is a need to maximum the overlap between the target return signal and the LO signal in order to maximize the coherent mixing efficiency.

Figure 3B:
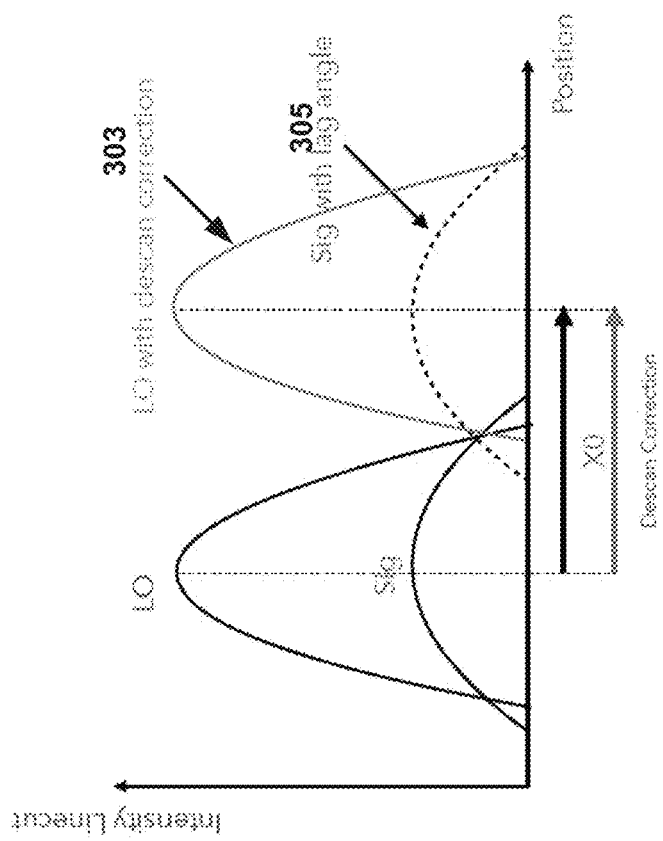
FIG. 3B is a diagram illustrating an example of intensity profile at a detection plane of a LiDAR system with descan compensation according to embodiments of the present disclosure.
Figure 3A:
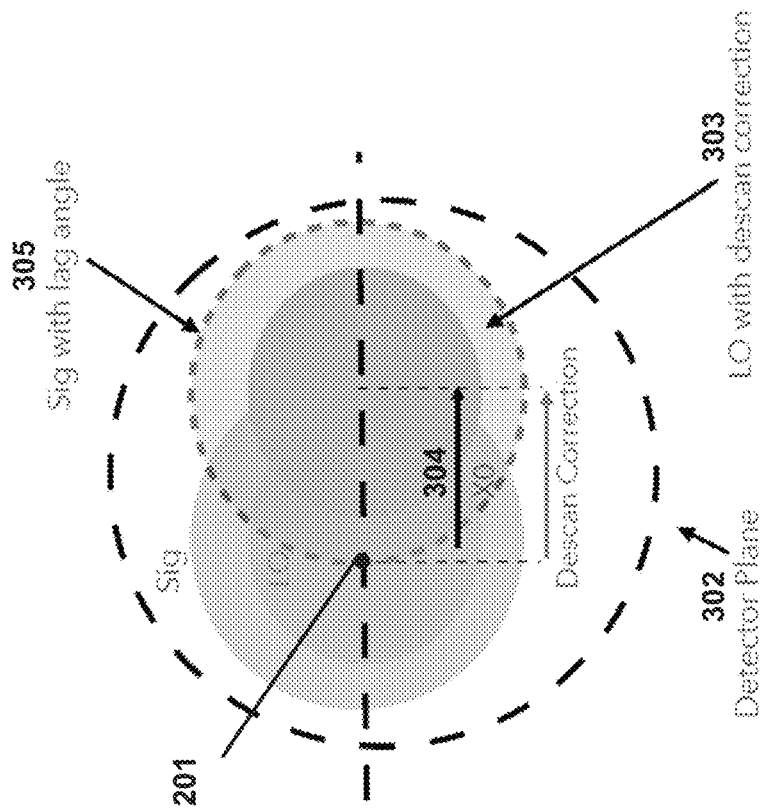
FIG. 3A is a diagram illustrating an example of a detection plane of a LiDAR system with descan compensation according to embodiments of the present disclosure.

FIG. 3A is a diagram illustrating an example of a detection plane 301 of a LiDAR system with descan compensation according to embodiments of the present disclosure. FIG. 3B is a diagram illustrating an example of intensity profile at the detection plane 301 in FIG. 3A, according to embodiments of the present disclosure. Referring to FIG. 3A and FIG. 3B, an optical subsystem of a LiDAR system (e.g., the system 100 in FIG. 1A) is configured to mitigate signal losses due to the lag-angle descan through the corrections such as a vertical (or horizontal) displacement of an imaging lens, or a tilted LO surface. Through the vertical lens displacement and/or the tilted LO surface, both an LO signal 303 and a target return signal 305 are shifted at the detection plane 301 of an optical receiver (e.g., one of the optical receivers 104). Due to the nature of the system, the LO signal 303 has a significantly larger sensitivity to the corrections relative to the target return signal 305. As illustrated in FIG. 3A, the LO signal 303 has a shift 304 due to the corrections which is much larger than a shift (not shown) of the target return signal 305. For example, the shift 304 of the signal 303 may be close to the misalignment 204. Thus, the misalignment between the LO signal 303 and the target return signal 305 may be compensated.

The magnitude of the corrections may be determined by the severity of the lag-angle descan. The displacement magnitude and direction may be tuned to accommodate different descan conditions. For example, the displacement magnitude and direction may be determined based on the scan speed of the scanning mirror. By this way, the overlap between the target return signal 305 and the LO signal 303 may be increased, thereby increasing the coherent mixing efficiency of the LiDAR system, e.g., for a fast scanning LiDAR system. The signal to noise ratio (SNR) of the optical receivers may be increased, and the performance of the LiDAR system may be improved.

Figure 4A:
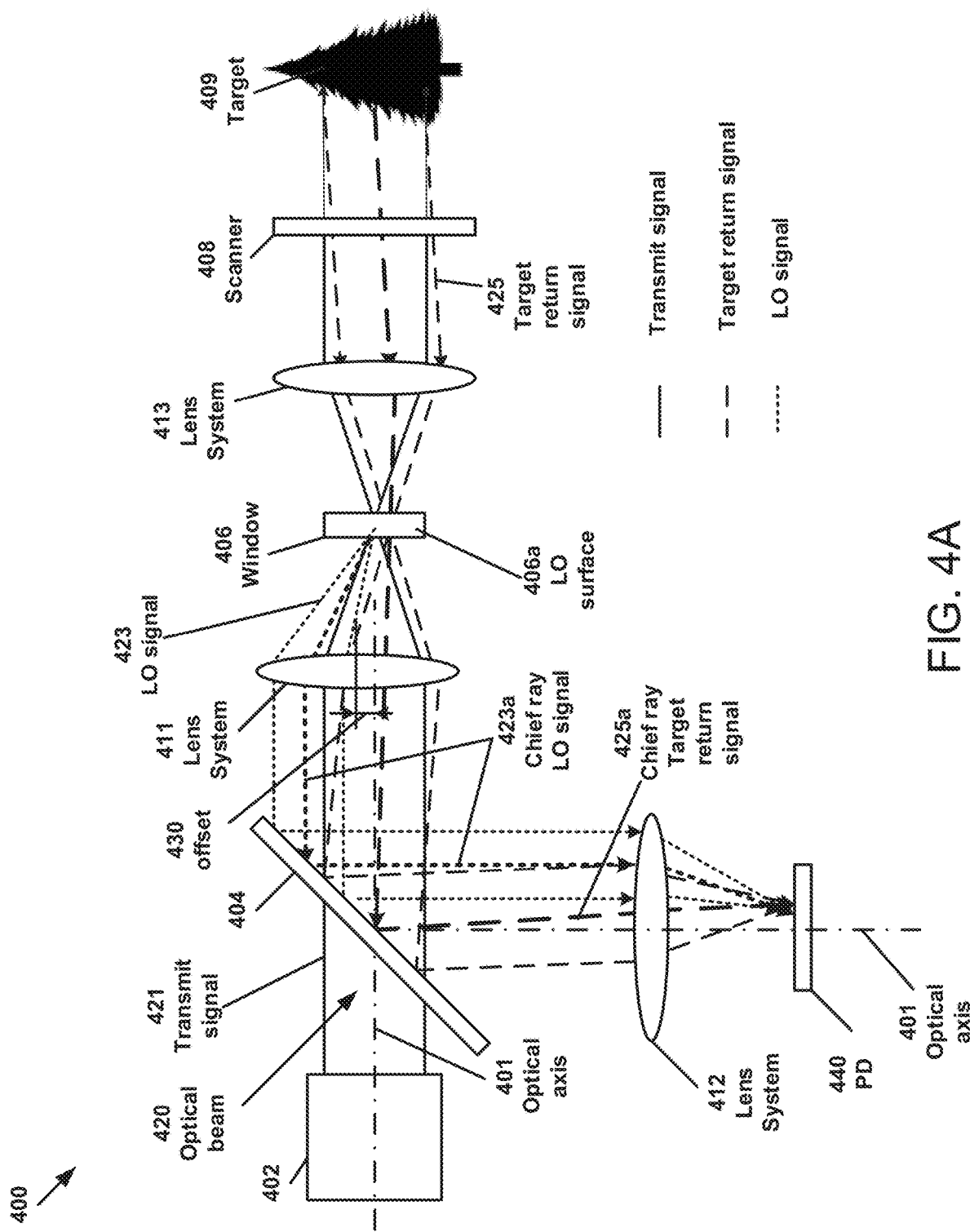
FIG. 4A is a diagram illustrating an example of an optical subsystem of a LiDAR system with descan compensation by an offset of an imaging lens, according to embodiments of the present disclosure.
Figure 4B:
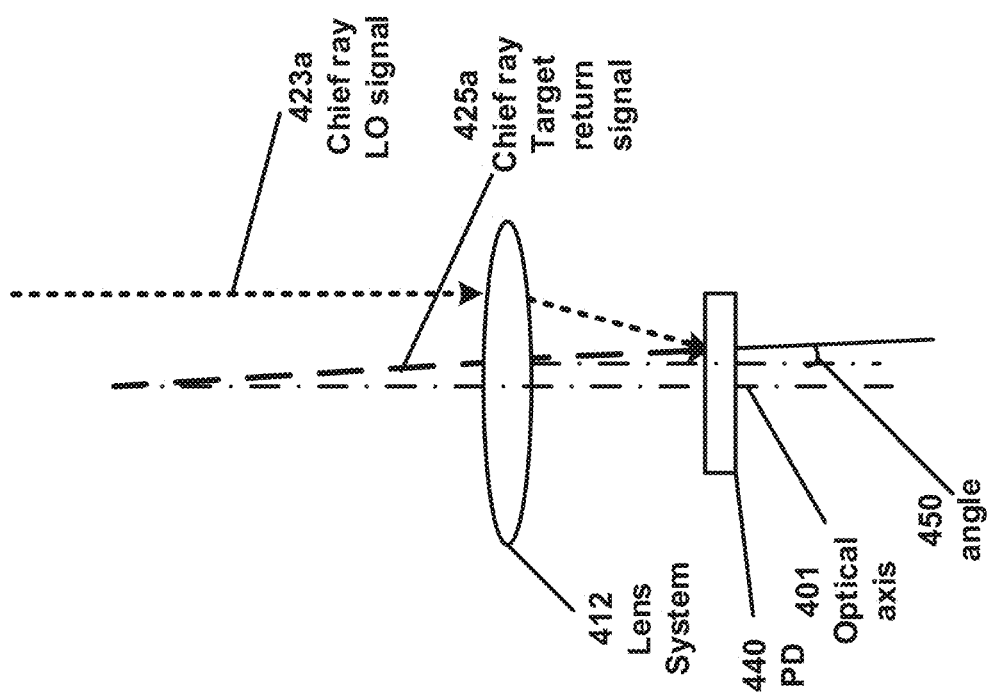
FIG. 4B is a diagram illustrating descan compensation in the optical subsystem in FIG. 4A, according to embodiments of the present disclosure.

FIG. 4A is a diagram illustrating an example of an optical subsystem 400 of a LiDAR system with descan compensation by an offset 430 of an imaging lens 410, according to embodiments of the present disclosure. FIG. 4B is a diagram illustrating descan compensation in the optical subsystem 400 in FIG. 4A, according to embodiments of the present disclosure. The LiDAR system may be the LiDAR system 100 as illustrated in FIG. 1A. The optical subsystem 400 may include components from optical circuits 101, free space optics 115, optical scanners 102, and optical receivers 104. The optical subsystem 400 may include an optical source 402 (e.g., located in the optical circuits 101). The optical subsystem 400 may include a beam splitter (BS) 404 (or a polarizing beam splitter (PBS)), a lens system 411, an optical window 406, a lens system 412 and a lens system 413, which may be components of the free space optics 115 or the optical circuits 101. The optical subsystem 400 may include an optical scanner 408, which may include one of the optical scanners 102. The optical subsystem 400 may include a photodetector (PD) 440, which may include one of the optical receivers 104. The optical subsystem 400 may have an optical axis 401 to align the multiple optical components.

Referring to FIG. 4A and FIG. 4B, the optical source 402 emits an optical beam 420. In a transmission path, the optical beam is a transmit signal 421. The optical beam 420 passes through the beam splitter (BS) 404 (or a polarizing beam splitter (PBS)) and then is focused on the optical window 406, which may be a partially reflective window plate. For the PBS case, a polarizing wave-plate or a Faraday rotator may be used to alter the reflected polarization from the optical window 406. The optical window 406 may include a flat or curved reflective surface, which is a LO surface 406a, where the local oscillator is generated from the reflective surface. The LO surface 406a may be a front surface or a back surface of the window 406.

The optical window 406 may transmit a portion of the optical beam 420 towards a target 409, and reflect a portion of the optical beam 420, by the reflective surface 406a to generate an LO signal 423. The transmit signal 421 may pass through the optical window 406, and be collimated by using a lens system 413. Then, the transmit signal 421 may propagate to the optical scanner 408, and transmit to the target 409 to scan the target.

The LO signal 423, which may be the reflected light from the optical window 406, is imaged on a detection plane of the PD 412 by the lens system 412. The reflected light from the target 409, which forms a target return signal 425, is insensitive to the optical window 406. The target return signal 425 is imaged on the PD 440 by the lens system 412 as well. The coherent mixing between the LO signal 423 and the target return signal 425 generates a radio frequency (RF) beat tone.

The optical beam 420 incident on the lens system 411 may be focused on the optical window 406, e.g., at the reflective surface 406, which may be either the front or back LO-generating surface capable of retro-reflecting light. In the case of a stationary scanner, the target return signal path experiences no descan and is therefore coaxial with the LO signal path. As discussed above, when the scanner increases in speed, without descan compensation, the LO signal path and the target return signal path begin to depart and consequently deteriorate the mixing efficiency on the detector.

Referring to FIG. 4A, the lens system 411 may be placed to have an offset 430 (or displacement) from the optical axis 401 in a direction perpendicular to the optical axis. The lens system 411 may be decentered on the plane perpendicular to the optic axis 401, and be moved up or down. The offset 430 (or displacement) in a direction perpendicular to the optical axis 401 may be referred to as a vertical offset. The lens system 411 may have a positive vertical offset 430 from the optical axis 401 (e.g., being moved up from the optical axis 401) or a negative vertical offset 430 from the optical axis 401 (e.g., being moved down from the optical axis 401).

The optical beam 420, which generates the LO signal 423, incidents at the lens system 411 decentered from the optical axis 401 before the reflection, and the LO signal incidents at the decentered lens system 411 after the reflection. Thus, a chief ray 423a of the LO signal 423 at the lens system 412 is highly sensitive to the vertical offset 430 of the lens system 411. On the other hand, there is a decenter acquired by the target return signal path on the lens system 412, but this is far less than what is experienced by the LO path due to its single pass nature. A chief ray 425a of the target return signal 425 at the lens system 412 is not highly sensitive to the vertical offset 430 of the lens system 411. Thus, the varying sensitivities to the vertical offset 430 between the LO path and the target return signal path enables tuning capabilities to optimize the beam overlap of the LO signal and the target return signal at the detector plane. The chief ray 425a of the target return signal 425 and the chief ray 423a of the LO signal 423 at the lens system 412 have different sensitivities to the vertical offset 430 of the lens system 411, which enables to increase the overlap of the target return signal 425 and the LO signal 423 at the detection place by the vertical offset 430.

For example, the LO surface 406a of the optical window 406 is disposed to have a displacement or offset from a focal plane (not shown) of the lens system 411. If the LO surface were at the focal plane of lens system 411 and the detection plane of the PD 440 were at the focal plane of lens system 412, the LO surface would be an intermediate image of the one found at the PD. A system of that nature would be insensitive to the vertical offset 430 of the lens system 411. Introducing the displacement or offset along the optical axis 401 between the lens system 411 and the LO surface 406a may allow for the LO signal to be shifted and decentered at the detection plane of the PD 440. Additionally, shifting the position of the optical window 406 along the optical axis 401 may provide an adjustment mechanism for the size of the LO signal 423 and thus enable further tuning of the overlap between the target return signal 425 and the LO signal 423.

Referring to FIG. 4A and FIG. 4B, the LO signal 423 is disposed to be decentered from the optical axis 401 on the lens system 412. The chief ray 423a of the LO signal 423 may be disposed to have an offset from the optical axis 401 on the lens system 412. The chief ray 423a of the LO signal 423 may be disposed to be decentered at the lens system 412 on the plane perpendicular to the optical axis 401. Thus, the chief ray 423a of the LO signal 423 may be shifted at the detection plane of the PD 440. As discussed above, when the optical scanner 408 is at a high scan speed, the target return signal 425 has a lag angle at the detection plane of the PD 440. By placing the lens system 411 with the vertical offset 430, the chief ray 423a of the LO signal 423 may have a larger shift than the chief ray 425a of the target return signal 425 at the detection plane of the PD 440. Therefore, the overlap of the LO signal 423 and the target return signal 425 at the detection plane of the PD 440 may be increased. For example, the coherent mixing efficiency of the target return signal 425 and the LO signal 423 may be in part proportional to the percentage of the overlap of the LO signal 423 and the target return signal 425 on the detection plane of the PD 440.

The vertical offset 430 may be determined based on a scan speed of the optical scanner 408, a scanner geometry relative to the detection plane, and/or a range of the target. As an example, the magnitude of the vertical offset 430 may be determined based on the scan speed. The higher the scan speed, the larger the offset 430. The vertical offset 430 may correspond to the scan speed. The vertical offset 430 may be determined such that a maximum coherent mixing efficiency of the target return signal 425 and the LO signal 423 occurs at the scan speed. The severity of the lag-angle descan may be determined on the scan speed of the optical scanner 408. Thus, the vertical offset 430 may be determined based on the severity of the lag-angle descan. For example without limitation, the offset 430 (or displacement) from the optical axis 401 may be 10 μm, 20 μm, 50 μm, 100 μm, 150 μm, 200 μm, 250 μm, 300 μm, 350 μm, 400 μm or any value therebetween. The above values are just a few examples. The values of the offset 430 are not limited as such. The offset 430 may have any values, depending on optical subsystem geometry. As another example, the direction of the offset 430 may be determined by the scanner geometry relative to the detection plane.

Referring to FIG. 4B, for example, the chief ray 425a of the target return signal 425 may be tiled with an angle 450 with respect to the optical axis 401 at the detection plane of the PD 440. The angle 450 of the chief ray 425a of the target return signal 425 with respect to the optical axis 401 at the PD 440 may correspond to the scan speed of the scanner 408. The higher the scan speed, the larger the angle 450, and the larger the descan. The vertical offset 430 may be determined based on the angle 450 of the chief ray 425a of the target return signal 425 with respect to the optical axis 401 at the detection plane of the PD 440, such that the maximum coherent mixing efficiency of the target return signal 425 and the LO signal 423 may occur and the descan may be compensated. For another example, the vertical offset 430 may be determined based on an angle of the chief ray 425a of the target return signal 425 with respect to the optical axis 401 at the lens system 412.

The magnitude and direction of the vertical offset 430 may be tuned to accommodate different descan conditions. In this way, the overlap between the target return signal 425 and the LO signal 423 may be increased, and the effects of the lag-angle descan may be compensated, thereby improving the performance of the LiDAR system.

Figure 5A:
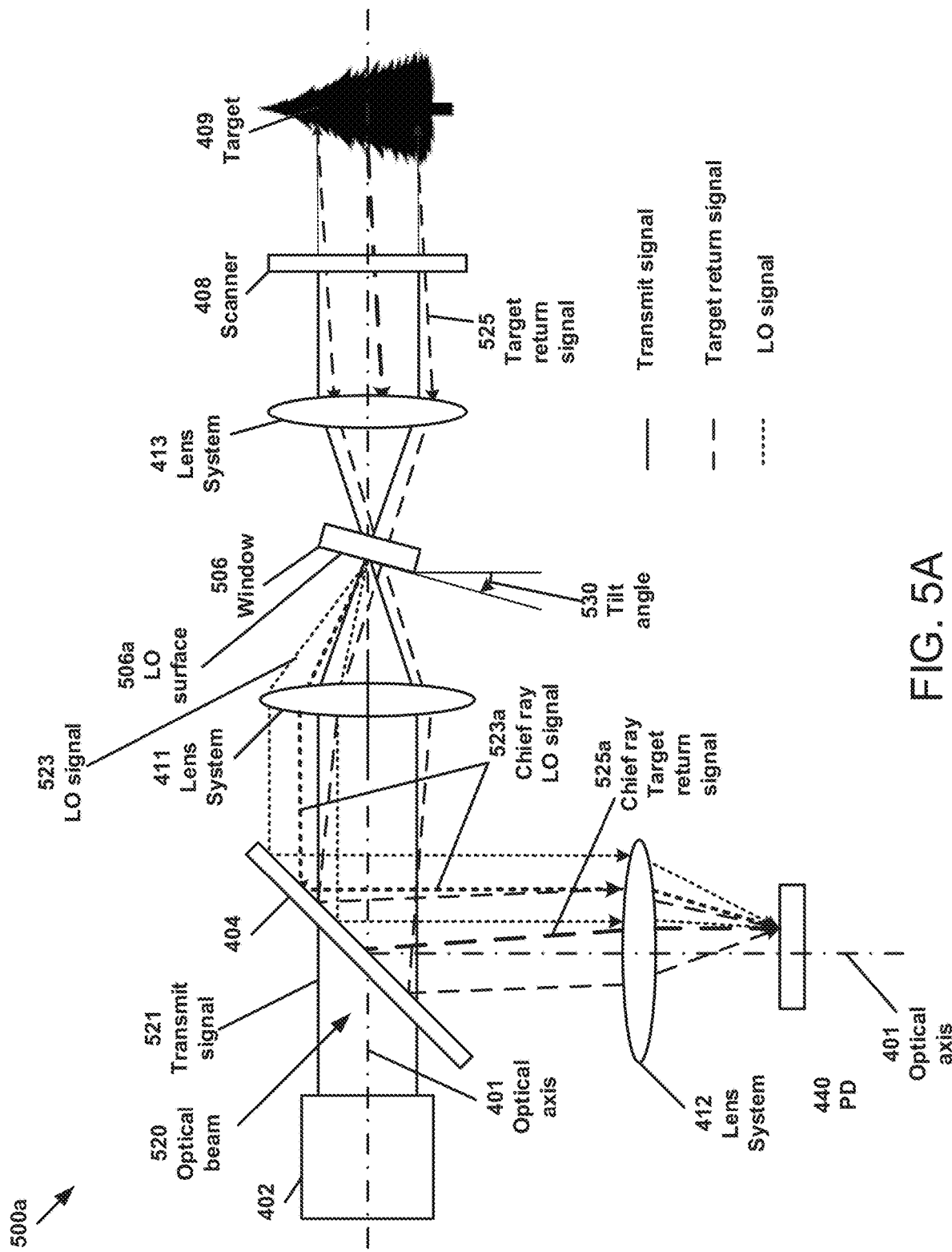
FIG. 5A is a block diagram illustrating an example of an optical subsystem of a LiDAR system with descan compensation by a tilted optical window according to embodiments of the present disclosure.

FIG. 5A is a block diagram illustrating an example of an optical subsystem 500a of a LiDAR system with descan compensation by a tilted optical window 506 according to embodiments of the present disclosure. The optical subsystem 500a is similar to the optical system 400 in FIG. 4A, except the lens system 411 without offset from the optical axis 401 and the optical window 506 being tilted with an angle 530 with respect to a plane perpendicular to the optical axis 401. For example, the optical window 506a may be a plate with two parallel surfaces, where the LO surface 506a is a first surface (front or back surface) of the plate. The two parallel surfaces of the optical window 506 are disposed with the angle 530 with respect to the plane perpendicular to the optical axis 401.

Similar to the optical subsystem 400, the LO surface 506a of the optical window 506 may be disposed to have a displacement or offset from a focal plane (not shown) of the lens system 411.

Referring to FIG. 5A, the optical source 402 emits the optical beam 520. In a transmission path, the optical beam is a transmit signal 521. The optical beam 520 passes through the beam splitter (BS) 404 (or a polarizing beam splitter (PBS)) and then is focused on the optical window 506. The optical window 506 may transmit a portion of the optical beam 520 towards a target 409, and reflect a portion of the optical beam 520, by the LO surface 506a to generate an LO signal 423. The transmit signal 521 may pass through the optical window 506, and be collimated by using a lens system 413. Then, the transmit signal 521 may propagate to the optical scanner 408, and transmit to the target 409 to scan the target. The LO signal 523, which may be the reflected light from the optical window 506, is imaged on a detection plane of the PD 412 by the lens system 412. The reflected light from the target 409, which forms a target return signal 525. The target return signal 525 is imaged on the PD 440 by the lens system 412 as well. The coherent mixing between the LO signal 523 and the target return signal 525 generates a radio frequency (RF) beat tone.

As illustrated in FIG. 5A, since the LO surface 506a is tilted with the angle 530 with respect to the plane perpendicular to the optical axis 401, the LO signal 523 is shifted after reflection from the optical window 506. Thus, the chief ray 523a of the LO signal 523 is disposed to have an offset from the optical axis 401 on the lens system 411 and the lens system 412. The chief ray 523a of the LO signal 523 is disposed to be decentered at the lens system 412 on the plane perpendicular to the optical axis 401. Therefore, the chief ray 523a of the LO signal 523 is shifted at the detection plane of the PD 440. By tilting the LO surface 506a with the angle 530, the chief ray 523a of the LO signal 523 has a larger shift than the chief ray 525a of the target return signal 525 at the detection plane of the PD 440. As a result, the overlap of the LO signal 523 and the target return signal 525 at the detection plane of the PD 440 is increased. The coherent mixing efficiency of the target return signal 525 and the LO signal 523 is increased because the mixing efficiency is in part proportional to the percentage of the overlap of the LO signal 523 and the target return signal 525 on the detection plane of the PD 440.

Similar to the vertical offset 430, the tilt angle 530 of the LO surface 506a or 507a may be determined based on a scan speed of the optical scanner 408, a scanner geometry relative to the detection plane, and/or a range of the target. As an example, the magnitude of the tilt angle 530 may be determined based on the scan speed, such that a maximum coherent mixing efficiency of the target return signal 525 and the LO signal 523 occurs at the scan speed. The tilt angle 530 may be determined based on the angle of the chief ray 525a of the target return signal 525 with respect to the optical axis 401 at the detection plane of the PD 440, such that the maximum coherent mixing efficiency of the target return signal 525 and the LO signal 523 may occur and the descan may be compensated. For another example, the tilt angle 530 may be determined based on an angle of the chief ray 525a of the target return signal 525 with respect to the optical axis 401 at the lens system 412. In one embodiment, the tilt angle 530 may be 0.1°, 0.5°, 1°, 2°, 3°, 4°, 5°, 20° or any value therebetween. The above values are just a few examples. The values of the tilt angle 530 are not limited as such. The tilt angle 530 may have any values, depending on optical subsystem geometry. As another example, the direction of the tilt angle 530 may be determined by the scanner geometry relative to the detection plane (not limited to just one direction).

Figure 5B:
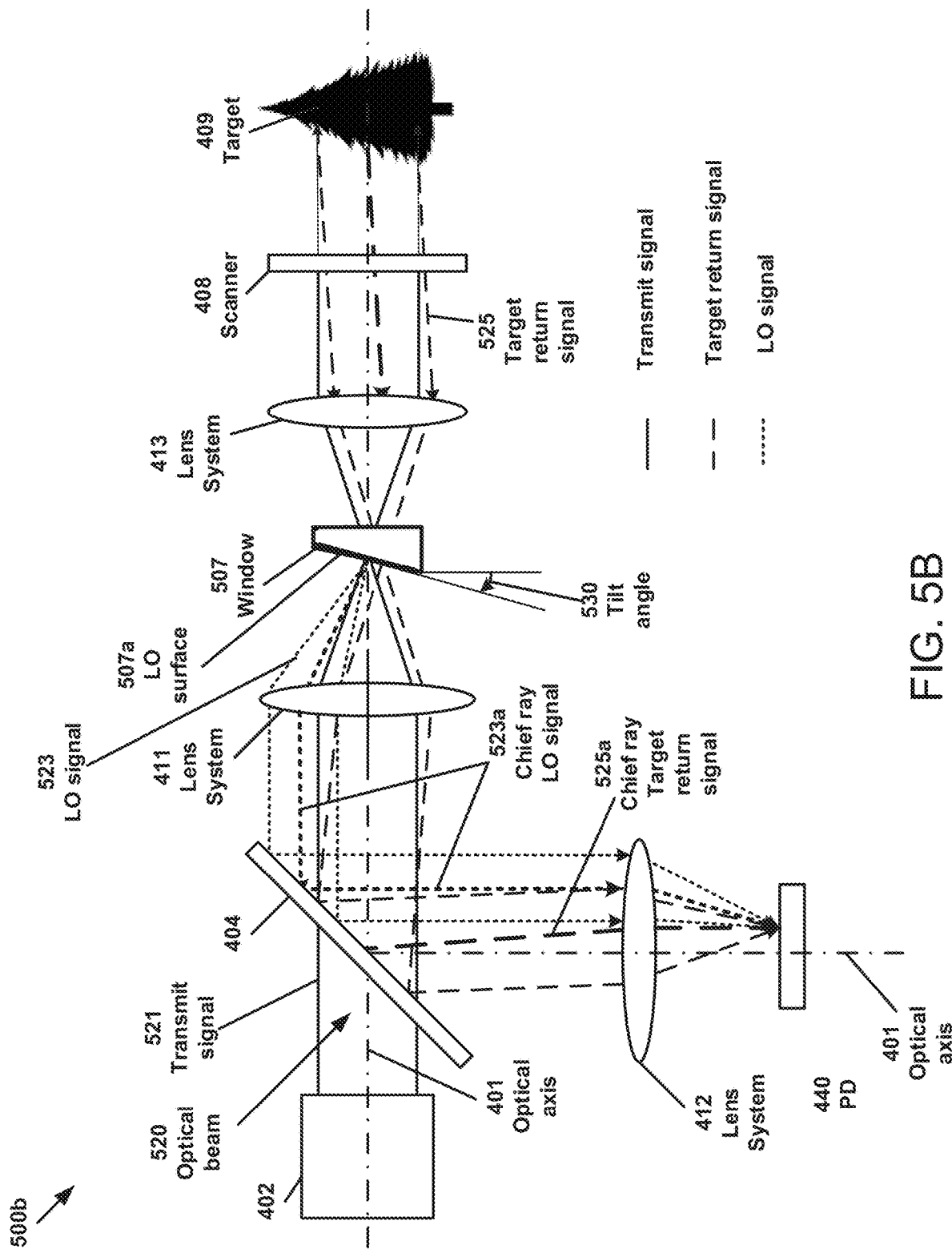
FIG. 5B is a block diagram illustrating an example of an optical subsystem of a LiDAR system with descan compensation by a wedged optical window according to embodiments of the present disclosure.

FIG. 5B is a block diagram illustrating an example of an optical subsystem 500b of a LiDAR system with descan compensation by a wedged optical window 507 according to embodiments of the present disclosure. The optical subsystem 500b is similar to the optical system 500a in FIG. 5A, except the wedged optical window 507 is used instead of the optical window 506a. For example, the wedged optical window 507 may include a LO surface 507a (front or back surface), and the other surface of the wedged window 507 is disposed perpendicular to the optical axis 401. The LO surface 507a is tilted with the angle 530. The LO signal 523 and the target return signal 525 propagate similarly as discussed in FIG. 5A.

Figure 5C:
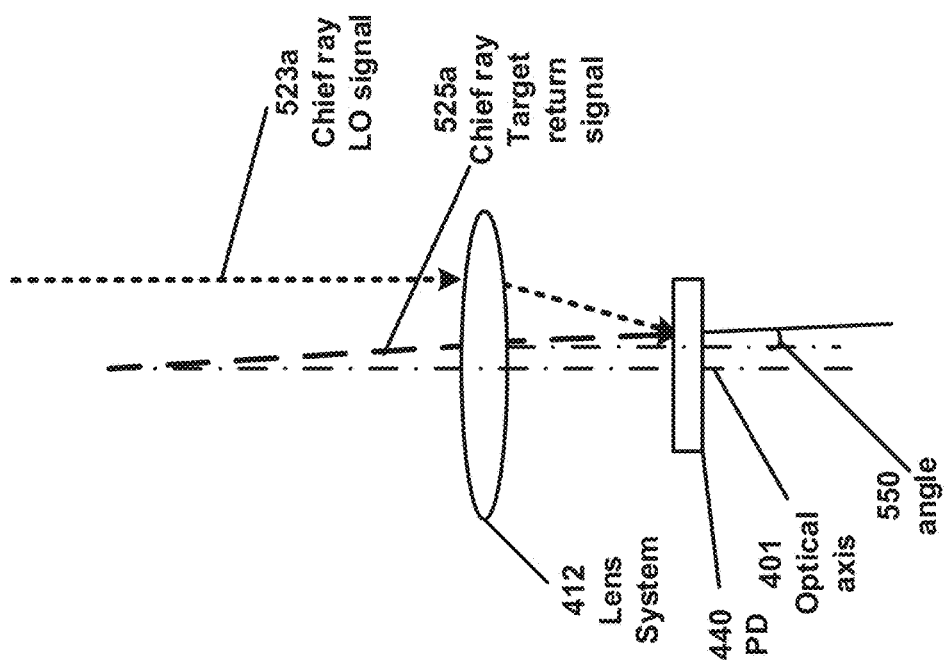
FIG. 5C is a diagram illustrating descan compensation in the optical subsystem in FIG. 5A and FIG. 5B, according to embodiments of the present disclosure.

FIG. 5C is a diagram illustrating descan compensation in the optical subsystem in FIG. 5A and FIG. 5B, according to embodiments of the present disclosure. Referring to FIG. 5C, for example, the chief ray 525a of the target return signal 525 may be tilted with an angle 550 with respect to the optical axis 401 at the detection plane of the PD 440. The angle 550 of the chief ray 25a of the target return signal 425 with respect to the optical axis 401 at the PD 440 may correspond to the scan speed of the scanner 408. The higher the scan speed, the larger the angle 550, and the larger the descan. The tilt angle 530 may be determined based on the angle 550 of the chief ray 525a of the target return signal 525 with respect to the optical axis 401 at the detection plane of the PD 440, such that the maximum coherent mixing efficiency of the target return signal 525 and the LO signal 523 may occur and the descan may be compensated. For another example, the tilt angle 530 may be determined based on an angle of the chief ray 525a of the target return signal 525 with respect to the optical axis 401 at the lens system 412. The magnitude and direction of the tilt angle 530 may be tuned to accommodate different descan conditions. In this way, the overlap between the target return signal 525 and the LO signal 523 may be increased, and the effects of the lag-angle descan may be compensated, thereby improving the performance of the LiDAR system.

Figure 6:
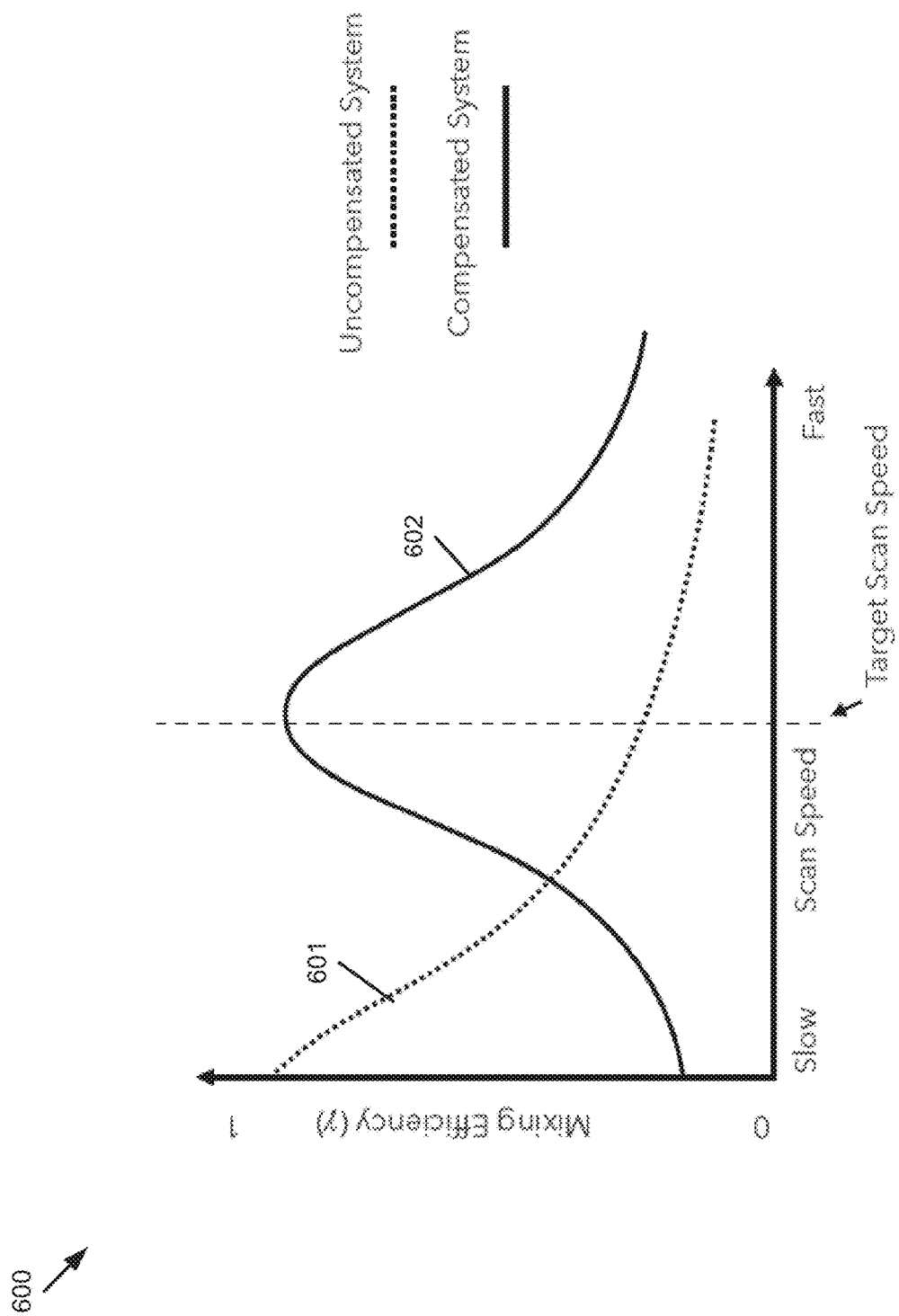
FIG. 6 is a diagram illustrating an example of a relationship between a mixing efficiency and scan speed for an uncompensated system and a compensated system respectively, for a given range of interest, according to embodiments of the present disclosure.

FIG. 6 is a diagram illustrating an example of a relationship between a mixing efficiency and a scan speed for a descan uncompensated system and a descan compensated system respectively, according to embodiments of the present disclosure. In a LiDAR system (e.g., system 100, 400, 500a, 500b), the coherent mixing efficiency is directly proportional to the overlap integral between the LO signal and the target return signal on the photodetector. The coherent mixing efficiency may be expressed as below:

$$\gamma \propto \frac{\left| \int \int_{-det}^{det} E_{LO}(x, y) E_s(x - x_0, y - y_0) dx dy \right|^2}{\left| \int \int_{-det}^{det} E_{LO}(x, y) dx dy \right|^2 \cdot \left| \int \int_{-det}^{det} E_s(x - x_0, y - y_0) dx dy \right|^2}$$

where $E_S$ and $E_{LO}$ are the target return signal and the LO signal on the photodetector respectively, $X_0$, $Y_0$ are the displacement of the signal spot due to lag angle, and det is the detector radius for a circular detector. The parameters may be optimized by relatively changing the LO spot size with respect to the lag-angle and the target spot size parameters. As discussed above the LO signal spot size may be changed by moving the optical window relative to the focal point of the lens system 411 without altering the target spot size. As such, the SNR of the photodetector is increased by using the techniques discussed above.

Referring to FIG. 6, the mixing efficiency 601 is decreased with increasing the scan speed due to descan for an uncompensated LiDAR system. By using the techniques discussed above, for example, by the lens system 411 having an offset of or tilting the LO surface of the optical window, the overlap of the LO signal and the target return signal at the detection plane of the is increased and descan is compensated. The descan compensation may be adjusted for a desired scan speed to deliver improved mixing efficiency. The mixing efficiency 602 of a compensated LIDAR system is illustrated in FIG. 6, where the LiDAR system is designed such that the maximum coherent mixing efficiency of the target signal and the LO signal occurs at the operating scan speed.

Figure 7A:
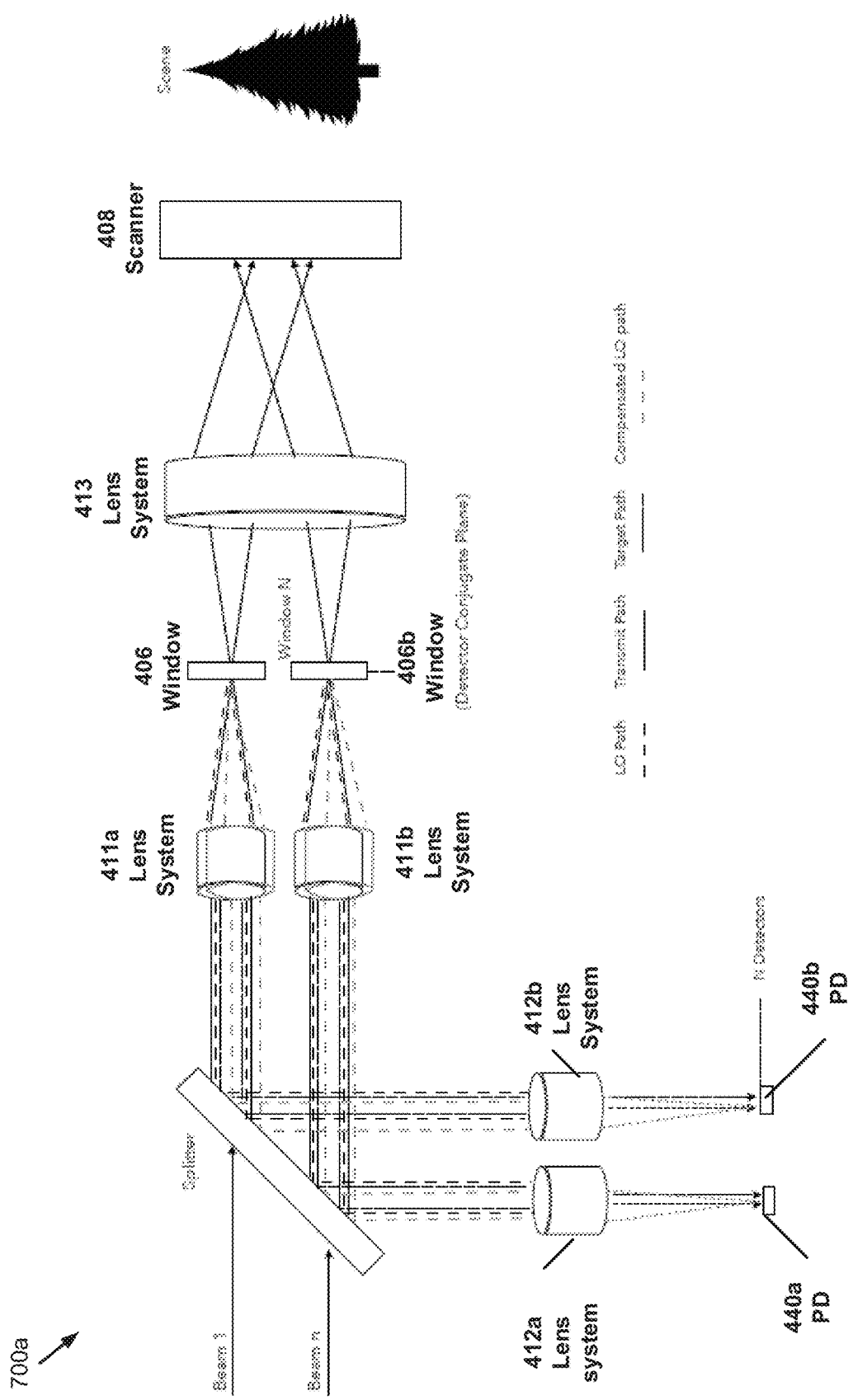
FIG. 7A is a block diagram illustrating an example of an optical subsystem of a LiDAR system with descan compensation for multiple optical beams according to embodiments of the present disclosure.
Figure 7B:
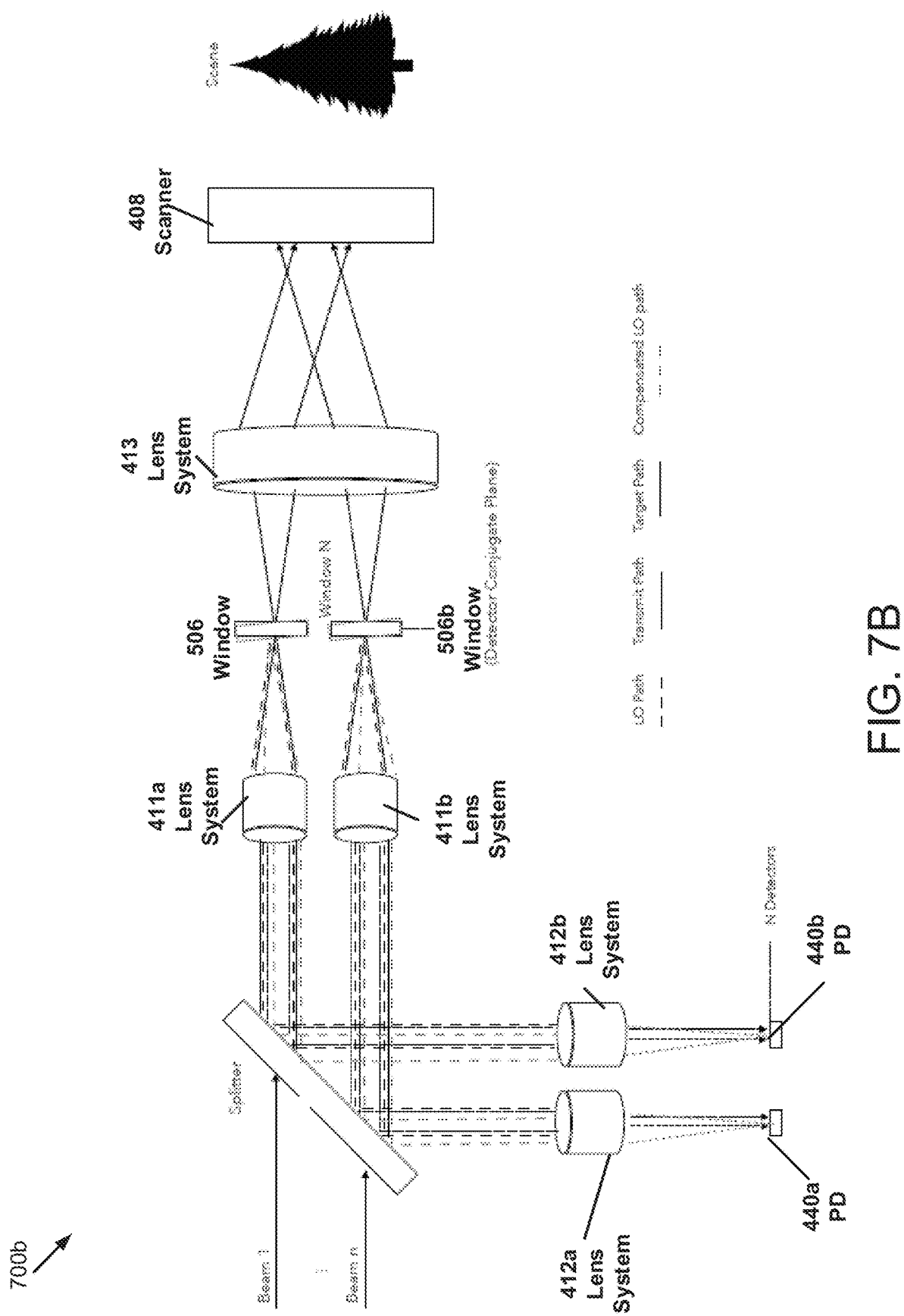
FIG. 7B is a block diagram illustrating an example of an optical subsystem of a LiDAR system with descan compensation for multiple optical beams according to embodiments of the present disclosure.

FIG. 7A is a block diagram illustrating an example of an optical subsystem 700a of a LiDAR system for multiple optical beams with descan compensation according to embodiments of the present disclosure. FIG. 7B is a block diagram illustrating an example of an optical subsystem 700b of a LiDAR system for multiple optical beams with descan compensation according to embodiments of the present disclosure. Referring to FIG. 7A and FIG. 7B, the techniques discussed above may be expanded to a multi-beam configuration. In this case, multiple beams are transmitted and multiple images are created at multiple PDs.

Referring to FIG. 7A, the optical subsystem 700a may have lens systems 411a, 411b which have an offset from the optical axis in a direction perpendicular to the optical axis. The optical subsystem 700a may have lens systems 412a, 412b to transmit the LO signals and the target return signals to PDs 440a, 440b. Decan may be compensated by displacing the lens system 411a, 411b. Though only two optical beams with two sets of lens systems (411a, 411b) are illustrated in FIG. 7A, the optical subsystem 700a may have multiple optical beams with multiple sets of lens systems by using the descan compensation techniques of displacing the lens systems as discussed above.

Referring to FIG. 7B, the optical subsystem 700b is similar to the optical subsystem 700a, except the lens systems 411a, 411b without offset from the optical axis and the LO surfaces of the optical windows 506, 506b being tilted with an angle with respect to a plane perpendicular to the optical axis. For example, the optical windows 506, 506b may be a plate with two parallel surfaces, or the optical windows 506, 506b are wedged optical windows. Decan may be compensated by tilting the LO surfaces of the optical windows 506, 506b. Though only two optical beams with two sets of lens systems (411a, 411b) are illustrated in FIG. 7A, the optical subsystem 700a may have multiple optical beams with multiple sets of lens systems by using the descan compensation techniques of tilting the LO-generating surfaces as discussed above.

Figure 8:
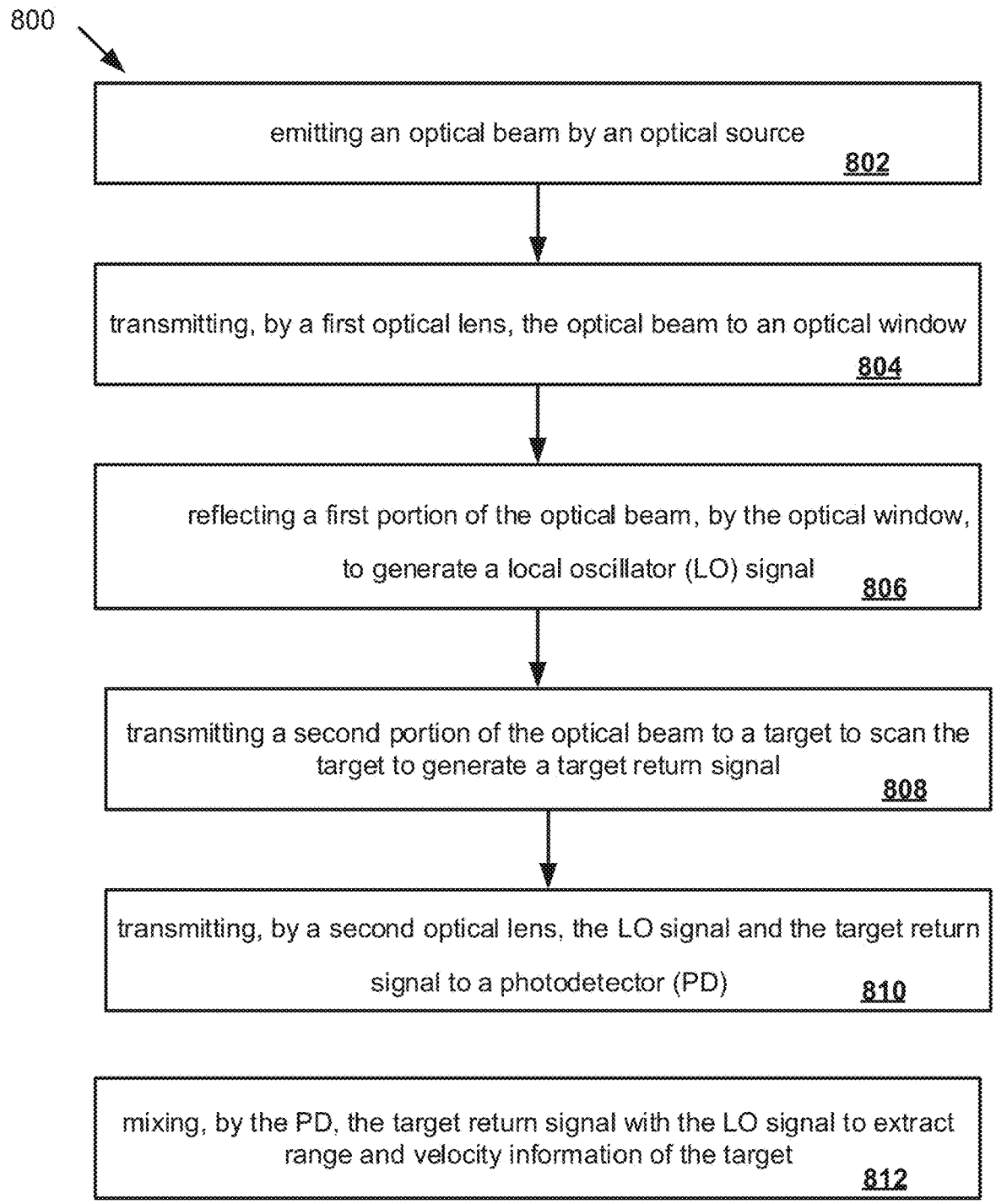
FIG. 8 is a flow diagram illustrating an example of a method of descan compensation in a LiDAR system according to embodiments of the present disclosure.

FIG. 8 is a flow diagram illustrating an example of a method of descan compensation in a LiDAR system according to embodiments of the present disclosure. Referring to FIG. 8, at block 802, an optical beam is emitted by an optical source. At block 804, by a first optical lens, the optical beam is transmitted to an optical window. At block 806, a first portion of the optical beam is reflected, by the optical window, to generate an LO signal 1. At block 808, a second portion of the optical beam is transmitted to a target to scan the target to generate a target return signal. At block 810, by a second optical lens, the LO signal and the target return signal are transmitted to a photodetector (PD). The LO signal is disposed to be decentered from an optical axis of an optical system on the second optical lens to increase a percentage of an overlap of the LO signal and the target return signal on a detection plane of the PD. At block 812, by the PD, the target return signal is mixed with the LO signal to extract range and velocity information of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LiDAR) system, comprising:
    an optical subsystem with an optical axis, comprising:
        an optical source to emit an optical beam;
        a first optical lens to transmit the optical beam;
        an optical window aligned with the first optical lens to reflect a first portion of the optical beam to generate a local oscillator (LO) signal;
        an optical scanner to transmit a second portion of the optical beam to a target to scan the target to generate a target return signal;
        a second optical lens to transmit the LO signal and the target return signal to a photodetector (PD),
        the photodetector (PD) to mix the target return signal with the LO signal to extract range and velocity information of the target, wherein the LO signal is disposed to be decentered from the optical axis on the second optical lens to increase a percentage of an overlap of the LO signal and the target return signal on a detection plane of the PD.

2. The LiDAR system of claim 1, wherein a chief ray of the LO signal is disposed to have an offset from the optical axis on the second optical lens, and wherein a coherent mixing efficiency of the target signal and the LO signal is proportional to the percentage of the overlap of the LO signal and the target return signal on the detection plane of the PD.

3. The LiDAR system of claim 1, wherein the optical window is disposed to have a displacement from a focal plane of the first optical lens.

4. The LiDAR system of claim 1, wherein the first optical lens is disposed to have a first offset in a direction perpendicular to the optical axis.

5. The LiDAR system of claim 4, wherein the first offset corresponds to the percentage of overlap of the LO signal and the target return signal on the detection plane of the PD.

6. The LiDAR system of claim 4, wherein the first offset is determined based on a scan speed of the optical scanner, and wherein a maximum coherent mixing efficiency of the target return signal and the LO signal occurs at the scan speed.

7. The LiDAR system of claim 6, wherein the first offset is determined based on an angle of a chief ray of the target return signal with respect to the optical axis on the detection plane of the PD.

8. The LiDAR system of claim 1, wherein a reflective surface of the optical window is tilted with a first angle with respect to a plane perpendicular to the optical axis.

9. The LiDAR system of claim 8, wherein the first angle corresponds to the percentage of the overlap of the LO signal and the target return signal on the detection plane of the PD.

10. The LiDAR system of claim 8, wherein the optical window comprises a wedged window, wherein the reflective surface includes a first surface of the wedged window, and wherein a second surface of the wedged window is disposed perpendicular to the optical axis.

11. The LiDAR system of claim 8, wherein the optical window comprises a plate with two parallel surfaces, wherein the reflective surface includes a first surface of the plate, and wherein the two parallel surfaces are disposed with the first angle with respect to the plane perpendicular to the optical axis.

12. The LiDAR system of claim 8, wherein the first angle is determined based on a scan speed of the optical scanner, and wherein a maximum coherent mixing efficiency of the target return signal and the LO signal occurs at the scan speed.

13. The LiDAR system of claim 12, wherein the first angle is determined based on an angle of a chief ray of the target return signal with respect to the optical axis on the detection plane of the PD.

14. The LiDAR system of claim 1, wherein the optical system further comprises
    a second optical source to emit a second optical beam;
    a third optical lens to transmit the second optical beam;
    a second optical window to reflect a first portion of the second optical beam to generate a second LO signal;
    the optical scanner to transmit a second portion of the second optical beam to the target to scan the target to generate a second target return signal;
    a fourth optical lens to transmit the second LO signal and the second target return signal to a second PD,
    the second PD to mix the second target return signal with the second LO signal, wherein the second LO signal is disposed to be decentered from the optical axis on the fourth optical lens to increase a percentage of an overlap of the second LO signal and the second target return signal on a detection plane of the second PD.

15. A method of light detection and ranging (LiDAR), comprising:
   emitting an optical beam by an optical source;
   transmitting, by a first optical lens, the optical beam to an optical window;
   reflecting a first portion of the optical beam, by the optical window, to generate a local oscillator (LO) signal;
   transmitting a second portion of the optical beam to a target to scan the target to generate a target return signal;
   transmitting, by a second optical lens, the LO signal and the target return signal to a photodetector (PD), comprising disposing the LO signal to be decentered from an optical axis of an optical system on the second optical lens to increase a percentage of an overlap of the LO signal and the target return signal on a detection plane of the PD; and
   mixing, by the PD, the target return signal with the LO signal to extract range and velocity information of the target.

16. The method of claim 15, wherein the transmitting, by the first optical lens, the optical beam to the optical window comprises transmitting the optical beam to the optical window by the first optical lens disposed to have a first offset from the optical axis in a direction perpendicular to the optical axis.

17. The method of claim 16, wherein the first offset is determined based on a scan speed of the optical scanner, such that a maximum coherent mixing efficiency of the target return signal and the LO signal occurs at the scan speed.

18. The method of claim 16, wherein the first offset is determined based on an angle of a chief ray of the target return signal with respect to the optical axis on the detection plane of the PD.

19. The method of claim 15, wherein the reflecting a first portion of the optical beam, by the optical window, comprising reflecting the first portion of the optical beam by the optical window tilted with a first angle with respect to a plane perpendicular to the optical axis.

20. The method of claim 19, wherein the first angle is determined based on a scan speed of the optical scanner, such that a maximum coherent mixing efficiency of the target signal and the LO signal occurs at the scan speed.

* * * * *